United States Patent Office 3,650,988
Patented Mar. 21, 1972

3,650,988
HYDROCARBON CONVERSION CATALYSTS
John S. Magee, Jr., Baltimore, and Warren S. Briggs, Silver Spring, Md., assignors to W. R. Grace & Co., New York, N.Y.
No Drawing. Filed Sept. 15, 1969, Ser. No. 858,134
Int. Cl. B01j 11/36, 11/40
U.S. Cl. 252—451                                15 Claims

ABSTRACT OF THE DISCLOSURE

A relatively low surface area highly stable and attrition resistant zeolite promoted hydrocarbon conversion catalyst wherein the semi-synthetic portion comprises a synthetic amorphous silica-alumina composite of which up to 50% of the synthetic alumina is derived from an alkali metal aluminate, and optionally clay. The catalyst finds utility in the conversion of hydrocarbons to more desirable derivatives thereof.

The present invention relates to an improved hydrocarbon conversion catalyst, and more specifically to a procedure for preparing zeolite promoted catalysts which contain synthetic and semi-synthetic matrices.

It is generally known that hydrocarbon conversion catalysts which contain substantial amounts of zeolite promoters, i.e. stabilized crystalline alumino silicates such as faujasite, provide a superior degree of catalytic activity and selectivity. In particular, when hydrogen or rare earth exchanged synthetic faujasites having a silica to alumina ratio of about 2.5 to 6 are combined with an inorganic matrix material such as clay and/or amorphous silica-alumina hydrogel, a highly active and selective hydrocarbon cracking catalyst is obtained.

In addition to being catalytically active and selective a commercially feasible hydrocarbon conversion catalyst must be durable. That is the catalyst must be capable of withstanding the chemical, thermal and physical rigors encountered in the operation of modern fluid and moving bed catalytic conversion units. To prepare a catalyst which is capable of withstanding temperatures in excess of 1700° F., a high concentration of water vapor, alternating reducing and oxidizing atmospheres, and condition of physical attrition and impact encountered in use, particular care must be taken in the selection not only of the zeolite promoter component but also the matrix used in preparing the catalyst.

It is therefore an object of the present invention to provide an improved zeolite promoted hydrocarbon conversion catalyst having a desiable low surface area characteristic couples with a high degree of catalytic activity and selectivity.

It is another object to provide superior synthetic and semi-synthetic clay-containing amorphous silica alumina composites which possess a high degree of thermal stability and attrition resistance.

It is a further object to provide a method for preparing synthetic and clay containing semi-synthetic matrix components for zeolite hydrocarbon conversion catalysts which contain relatively high proportions of alumina in the synthetic component thereof.

These and still further objects of the present invention will become readily apparent to one skilled in the art from the following detailed description and specific examples.

Broadly our invention contemplates improved, relatively low surface area, synthetic catalyst composites which contain zeolite and optionally clay dispersed throughout a matrix of amorphous, silica-alumina hydrogel. The silica-alumina hydrogel contains from 10% to 50% by weight synthetic alumina, wherein up to 50% of the synthetic alumina is derived from an alkali metal aluminate during preparation of the matrix.

More specifically, we have found that an improved zeolite promoted catalytic composition may be obtained by a process which involves:

(1) Gelling an aqueous solution of alkali metal silicate, which optionally contains clay dispersed therein, with mineral acid, carbon dioxide, and/or acid salt at a pH of from about 4 to 12 under conditions which will provide substantially complete gelation within a period of 5 seconds to 30 minutes.

(2) Adding alkali metal aluminate to said gelled silicate substantially immediately after gelling thereof to obtain a silica-alumina hydrogel composite, (3) Aging the composite for a period of from about 10 to 120 minutes at a temperature of 60 to 170° F., (4) Adding zeolite to said composite, preferably after adjusting the pH of the composite to from about 5 to 8, (5) Forming said composite to particles of desired size and shape, and (6) Washing the composite to remove soluble impurities therefrom.

By following the above generally outlined procedure wherein an alkali metal aluminate is incorporated in the catalyst preparation during the aging of the gelled silicate portion, we have found that a desirable, low surface area composite is obtained which exhibits high catalytic activity, superior thermal stability and a high degree of physical strength and attrition resistance.

The catalyst compositions contemplated herein contain from about 1 to 30% by weight zeolite promoter. The zeolite promoter is preferably a thermally stable crystalline alumino-silicate having uniform pore openings within the range of from about 6 to 15 A. units. The preferred zeolites are synthetic faujasites which possess a silica to alumina ratio within the range of from about 2.5 to 6.0 and furthermore, which possess considerable thermal stability at temperatures on the order of 15 to 1700° F. Typical examples of zeolite promoters which may be used in the preparation of our catalyst are calcined rare earth exchanged Type X (CREX) and Type Y (CREY) zeolites which are fully described in U.S. Pat. 3,402,996. In addition to rare earth exchanged zeolites, hydrogen exchanged faujasites such as hydrogen Type X and Type Y zeolites which have undergone further treatment to enhance the stability thereof may also be used. Typical stabilized hydrogen exchanged zeolite is identified as Z–14 US and fully described in U.S. Pat. 3,293,192. It is also contemplated that the zeolite promoters utilized herein may be of the variety which contain both hydrogen and other stabilizing or catalytically active metals such as found in Group III through Group VIII of the Periodic Table.

The matrix portion of the presently intended catalyst may contain a naturally occurring clay in amounts ranging from about 0 to 60% by weight of the finished catalyst. Naturally occurring clays such as kaolin, halloysite, and montmorillonite may be utilized. These clays generally possess a particle size falling within the range of from about 0.1 to 10 microns. While raw naturally occurring clays may be used to advantage in the preparation of our catalyst, it is also contemplated that heat or chemically modified clays such as metakaolin or acid treated halloysite may be utilized herein.

The synthetic portion of the present matrices comprises a silica alumina hydrogel in amounts ranging from 40 to 80% by weight of the finished catalyst. The synthetic silica aluminohydrogel will contain from about 10 to 50% by weight $Al_2O_3$ with the remainder being silica. The silica portions of the hydrogel is obtained by gelling an aqueous solution of alkali metal silicate, typically sodium silicate. The alumina portion of the synthetic silica alumina hydrogel is obtained by incorporating an appropriate acidic aluminum salt, such as alum, and an alkali metal aluminate, such as sodium aluminate, into the matrix preparation mixture. In order to obtain the desired characteristics present in our novel catalyst, the synthetic alumina portion of the silica-alumina hydrogel must be partially obtained from an alkali metal aluminate to the extent that at least from about 10 to 50% by weight of the alumina present in the silica-alumina hydrogel is derived from said alkali metal aluminate.

In the preparation of the catalyst compositions contemplated herein, alkali metal silicate solution, preferably containing from about 3.0 to 6.0% silicate dissolved in water is admixed with the optional clay component. This mixture is a relatively viscous slurry which is then combined with an acid gelling agent. The gelling agent, which may be a mineral acid such as sulfuric acid, hydrochloric acid, or nitric acid, and more preferably carbon dioxide, is added to the silicate in amounts and in a manner which effect gelation of the silicate within a period of from about 1 to 10 minutes. Generally, it is found that the initial pH of the sodium silicate-clay slurry which is on the order of from about 11.5 to 12.5 is reduced to from about 9.5 to 10.5 by addition of the gelling agent. In this pH reduction range it is observed gelation of the silicate occurs within the desired time period.

Substantially immediately after gelation of the silicate, an alkali metal aluminate such as sodium aluminate is added to the gelled slurry. The sodium aluminate is prepared by the reaction of sodium hydroxide with alumina wherein preferably from about 1 to 1.4 moles of $Na_2O$ is combined with each mole of alumina.

Subsequent to, and substantially immediately after, the addition of alkali metal aluminate, the composition slurry is then aged at a temperature of from about 60 to 170° F. for a period of from about 10 to 120 minutes. This aging period is critical to the obtaining of a desired silica alumina composite.

Subsequent to this aging period, additional alumina is added to the composite mixture preferably in the form of aluminum sulfate, i.e. alum or other soluble alumina salts such as aluminum nitrate, chloride, acetate, etc. The amount of alum added at this point would be that amount required to bring the alumina content of the synthetic silica alumina hydrogel to the desired level. In general, the alum is added in the form of an aqueous solution having an alum concentration of from about 20 to 90 g. $Al_2O_3$ per liter. Ordinarily from about 50 to 90% of the alumina portion of the synthetic silica alumina hydrogel is added in the form of alum or other soluble acidic aluminum salts.

Subsequent to alum addition, the pH of the slurry is adjusted to a range of from about 6 to 9 and preferably by the addition of ammonia. After adjusting the pH the zeolite component is added in amounts required to impart the desired concentration thereof in the finished catalyst composite. Subsequent to addition of molecular sieve component the mixture is thoroughly agitated, and preferably the pH thereof is adjusted by the addition of ammonia to a range of from about 7 to 8. The slurry is then preferably filtered, then reslurried to a solid content of from about 5% to 30% and preferably spray dried at a temperature of from about 150 to 250° F. The spray drying operation converts the finely divided catalyst slurry into a particulate product which consists of microspheres having diameters within the range of from about 30 to about 80 microns. Subsequent to spray drying the catalyst composite is washed with water and the dilute electrolyte solutions such as ammonium sulfate and ammonium carbonate to remove soluble impurities from the overall composite. Preferably during the washing operation the soda level of the composite is reduced to a level of from about 0.01 to 0.15% by weight $Na_2O$. Also the sulfate level is reduced to below about 1.0% by weight.

The catalyst is then preferably dried at a temperature of from about 250 to 450° F. to reduce the moisture level below about 30% by weight. This catalyst is ready for use in a typical fluid cracking operation. It is also contemplated that the catalyst may be prepared in the form of a bead type catalyst which is suitable for use in a moving bed catalytic operation.

The catalyst composites prepared herein will possess a fresh surface area of from about 150 to 300 m.$^2$/g. The water and nitrogen pore volumes of the product range from about 0.4 to 0.8 cc./g. and 0.3 to 0.6 cc./g. respectively. Subsequent to thermally treating the catalyst composites at a temperature of 1350° F. for 8 hours in 100% steam it is found that the surface area will be reduced to a level of typically about 100 to 150 m.$^2$/g. Also during this thermal treatment it is found that the water pore volume and nitrogen pore volume is reduced by only about 10 to 15%.

The catalyst prepared by the present method, in addition to possessing particularly desirable surface area and pore volume characteristics also possess a high degree of attrition resistance. Typically, the present catalyst when subjected to a standard Davison attrition test, will be found to possess attrition indexes within the range of 25 to 35. The Davison attrition index (DI) as referred to in the following examples is determined as follows:

A 7 gram sample is screened to remove particles in the 0 to 20 micron size range. The 20+ micron sample is then subjected to a 5 hour test in a standard Roller Particle Size Analyzer using a 0.07 inch jet and 1 inch I.D. U-tube as supplied by the American Instrument Co. of Silver Spring, Md. An air flow rate of 9 liter per minute is used. The Davison Index value is calaculated as follows:

Davison Index $$= \frac{\text{0–20 micron material formed during test}}{\text{Original 20+ micron fraction}} \times 100$$

The present catalyst composite, when typically promoted by zeolites on the order of from about 7 to 12% by weight, will typically demonstrate activity in the range of from about 80 to 90% conversion when subjected to the standard activity test described by Ciapetta and Henderson, Oil and Gas Journal, Oct. 16, 1967. This procedure for determining activity is used to obtain the data set forth in the following examples.

Having described the basic aspects of the present invention, the following examples are given to illustrate specific embodiments thereof:

EXAMPLE I

The following general procedure was used to prepare the catalysts set forth in Runs 1 to 3 of Table I below:

A 4% sodium silicate solution containing kaolin clay dispersed therein was pumped at a rate of 1.0 gallon/min. along with carbon dioxide at a rate of 0.40 to 0.45 cu. ft./min. (10 p.s.i.g.) through an inline agitator to form a silica hydrogel. The average gel time was 4 to 6 minutes. The hydrogel was produced over a period of 20 to 22 minutes. The pH of the gelled slurry was 9.5 to 9.8. Substantially immediately after producing the silica hydrogel a solution containing various amounts of sodium aluminate ($Na_2A.Al_2O_3.3H_2O$) was added to the hydrogel to give the percent $Al_2O_3$ concentration via $AlO_2$ indicated in the table. The mixture was then aged for 30 minutes while recirculating through a pump at 90° F. An aqueous solution of alum ($Al_2(SO_4)_3.18H_2O$) was added to the mixture in amounts necessary to raise the synthetic alumina level to about 40% by weight. The pH of the mixture was adjusted to about 7 to 8 and the indicated amount of zeolite promoter was added. The promoter was calcined rare earth exchanged Type X zeolite (CREX). The composition was spray dried at 200 to 600° F. and washed with ammonium sulfate solution and water to remove soluble impurities. The catalyst was dried at 400° F. and further washed with ammonium sulfate and water to give the indicated $Na_2O$ and $SO_4^=$ levels.

In Runs 4 and 5 in Table I below the above general procedure was generally followed; however, in Run 4 the sodium aluminate was added after aging the produced hydrogel for 30 minutes, and in Run 5 the entire synthetic alumina portion of the hydrogel was added in the form of alum.

TABLE I

| Run number | 1 | 2 | 3 | 4 | 5 |
|---|---|---|---|---|---|
| $Al_2O_3$ vis $AlO_2$ wt percent | 15 | 37.5 | 50 | 50 | 0 |
| Promoter wt. percent (Si/Al basis) | 10 | 10 | 10 | 10 | 10 |
| Clay, wt. percent | 43 | 43 | 43 | 30 | 30 |
| $RE_2O_3$, wt. percent | 3.46 | 3.35 | 3.77 | 3.40 | 2.80 |
| $Na_2O$, wt. percent | 0.08 | 0.08 | 0.09 | 0.10 | 0.06 |
| $Al_2O_3$, wt. percent | 37.2 | 41.5 | 40.7 | 40.0 | 41.0 |
| $SO_4^=$, wt. percent | 0.18 | 0.03 | 0.77 | 0.24 | 0.29 |
| DI | 49 | 37 | 29 | 72 | 64 |
| SA $m.^2/g$ after 3 hrs. at 1,000° F | 218 | 214 | 200 | 280 | 255 |
| $N_2$ pore volume to 600 A. after 3 hrs. at 1,000° F | 0.33 | 0.59 | 0.59 | 0.60 | 0.65 |

From the above data it will be noted that the attrition resistance of the catalysts of Runs 1, 2 and 3 improves as the amount of $Al_2O_3$ added via $AlO_2$-(sodium aluminate) increases. Furthermore, it is seen that when the aging period of the gelled silicate in the presence of sodium aluminate is eliminated as shown in Run 4, the attrition resistance decreases. When addition of $Al_2O_3$ via $AlO_2^-$ is eliminated as shown in Run 5, the attrition resistance also decreases.

EXAMPLE II

To illustrate the catalytic activity of the catalysts of the present invention, the catalysts prepared in Run 1, 2 and 3 of Example I were subjected to microactivity tests as outlined by Ciapetta and Henderson, Oil and Gas Journal, Oct. 16, 1967. The catalyst samples were first subjected to a 3 hr. 1000° F. thermal treatment and an 8 hr. 1350° F. 15 p.s.i.g. steam treatment and tested at 900° F. using a 2 weight hour space velocity (WHSV) and a Light West Texas Devonian oil fraction boiling at 500 to 800° F. The results are tabulated in Table II below.

TABLE II

| Catalyst | Percent conversion | Percent $H_2$ | Percent coke |
|---|---|---|---|
| Run No.: | | | |
| 1 | 83.0 | 0.11 | 5.3 |
| 2 | 86.0 | 0.09 | 6.0 |
| 3 | 84.0 | 0.16 | 5.3 |

EXAMPLE III

To illustrate the steam and thermal stability of the catalysts of the present invention, 3 catalyst samples were prepared which are compared in Table III below. The procedure used to prepare the catalysts of Runs 6 and 7 was essentially the same as for Runs 1, 2 and 3 of Example I. The procedure used for Run 4 of Example I was used to prepare the catalyst in Run 8.

TABLE III

| Run No. | 6 | 7 | 8 | 9 |
|---|---|---|---|---|
| Promoter | CREX | CREY | CREX | CREX |
| Type and wt. percent | 13 | 11 | 13 | 10 |
| $RE_2O$ wt. percent | 4.2 | 2.1 | 4.2 | 3.0 |
| $Na_2O$ wt. percent | 0.085 | 0.08 | 0.10 | 0.082 |
| $Al_2O_3$ wt. percent | 40.8 | 39.7 | 35.0 | 37.2 |
| $SO_4^=$ | 1.0 | 0.13 | 0.28 | 0.41 |
| After thermal (dry) treatment, 3 hrs.: | | | | |
| 1000° F.: | | | | |
| SA $m.^2/g$ | 233 | 282 | 273 | 256 |
| PV cc./g | 0.36 | 0.47 | 0.40 | 0.63 |
| 1650° F.: | | | | |
| SA $m.^2/g$ | 157 | 191 | 83 | 144 |
| PV cc./g | 0.27 | 0.35 | 0.18 | 0.43 |
| After steam treatment, 8 hrs. 1350° F., 15 p.s.i.g.: | | | | |
| SA $m.^2/g$ | 112 | 139 | 113 | 91 |
| PV cc./g | 0.31 | 0.42 | 0.32 | .36 |
| 1650° F. PV, 1000° F. PV | 0.75 | 0.74 | 0.45 | 0.68 |
| 1350° steam PV, 1000° F. PV | 0.86 | 0.89 | 0.80 | 0.57 |

$RE_2O$—Rare earth oxides.
CREY—Calcined rare earth Type Y zeolite.
SA—Surface area.
PV—Pore volume $N_2$ at 10-600 A.

From the above it is seen that in Runs 6 and 7 the pore volume retention after treatment at 1650° F. for 3 hours is considerably better than for Run 8 wherein aging of the gelled silicate in the presence of $Al_2O_3$ via $AlO_2^-$ has been eliminated. This excellent pore volume retention of the catalysts of the present invention is clearly illustrated by comparison of the ratio of pore volume figures given at the bottom of the table, wherein the pore volume retention after 1050° F. is divided by pore volume retention after 1000° F.

We claim:

1. An improved attrition resistant composition which comprises a synthetic crystalline alumino silicate zeolite dispersed throughout a matrix containing a synthetic amorphous silica alumina hydrogel, the improvement which comprises:
   utilizing a silica alumina hydrogel with an alumina content of from about 10 to 50% by weight wherein up to 50% of said alumina is derived from an alkali metal aluminate, said aluminate being added to a gelled silicate substantially immediately after gelling and the mixture being aged for 10 to 120 minutes at a temperature of 60 to 160° F.

2. The improved catalyst of claim 1 which contains from about 1 to 30% by weight crystalline alumino silicate zeolite.

3. The improved catalyst of claim 1 which contains from about 10 to 50% by weight clay.

4. The improved catalyst of claim 1 which contains from about 10 to 90% by weight synthetic silica alumina hydrogel.

5. The composition of claim 1 wherein said crystalline alumino silicate zeolite is calcined rare earth exchanged Type X zeolite.

6. The improved catalyst of claim 1 wherein the crystalline alumino silicate zeolite is calcined rare earth exchanged Type Y zeolite.

7. The improved catalyst of claim 3 wherein said clay is kaolin.

8. A process for preparing a zeolite promoted catalyst composition which contains a synthetic amorphous silica alumina hydrogel containing up to 50% by weight synthetic alumina which comprises:
   (a) gelling an alkali metal silicate solution at a pH of from about 9 to 12 by the addition of a member selected from the group consisting of carbon dioxide, mineral acid, and salts of mineral acids;
   (b) adding an alkali metal aluminate to said gelled silicate substantially immediately after gelling thereof in an amount to provide from about 10 to 50% by weight of the synthetic alumina in said hydrogel;
   (c) aging said aluminate gelled silicate mixture for a period of 10 to 120 minutes at a temperature of 60 to 170° F.;

(d) adding a zeolite to said aged mixture; and (e) filtering, washing and drying the zeolite composite to obtain a particulate catalyst composite substantially free of water soluble impurities.

9. The method of claim 8 wherein said alkali metal silicate is sodium silicate.

10. The method of claim 8 wherein said alkali metal aluminate is sodium aluminate.

11. The method of claim 10 wherein said aluminate composition contains 1 to 1.4 moles $Na_2O$ per mole of $Al_2O_3$.

12. The method of claim 8 wherein from about 1 to 30% by weight zeolite is added to said composition.

13. The method of claim 8 wherein up to about 60% by weight clay is added to said composition.

14. The method of claim 10 wherein said zeolite is selected from the group consisting of calcined rare earth exchanged X, calcined rare earth exchanged Y, and Z-14 US zeolites.

15. The method of claim 8 wherein said gelling agent is carbon dioxide.

References Cited

UNITED STATES PATENTS

| | | | |
|---|---|---|---|
| 3,425,956 | 2/1969 | Baker et al. | 252—455 |
| 3,431,196 | 3/1969 | Dobres et al. | 252—455 X |
| 3,449,265 | 6/1969 | Gladrow et al. | 252—455 |

DANIEL E. WYMAN, Primary Examiner

C. F. DEES, Assistant Examiner

U.S. Cl. X.R.

252—455 Z